(12) United States Patent
Schesser et al.

(10) Patent No.: US 6,414,405 B1
(45) Date of Patent: Jul. 2, 2002

(54) METHOD AND APPARATUS FOR OPERATING CABLED-FIBER UNDERSEA NETWORK, AND FAULT-TOLERANT BRANCHING UNIT FOR USE THEREIN

(75) Inventors: Joel Schesser, Marlboro; Francis Bekampis, Wayside; Cleo Anderson; Robert Lynch, both of Colts Neck; David Gunderson, Ocean, all of NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/460,011

(22) Filed: Dec. 13, 1999

(51) Int. Cl.[7] .................................................. H02J 7/00
(52) U.S. Cl. .......................... 307/149; 307/52; 307/38; 307/100; 307/113; 307/125; 307/131; 307/139; 307/149
(58) Field of Search .......................... 307/149, 38, 100, 307/139, 113, 125, 131, 52; 340/850

(56) References Cited

U.S. PATENT DOCUMENTS 5,841,205 A  * 11/1998  Webb .......................... 307/130
6,157,098 A  * 12/2000  Kojima et al. ............... 307/139

* cited by examiner

Primary Examiner—Stephen W. Jackson
Assistant Examiner—Robert L Deberadinis

(57) ABSTRACT

A powering arrangement for an undersea cable system provides that each branch of the system is supplied with a current equal to half of the current in the trunk. By coupling both branches to the trunk, the current adds at the branching unit. Upon occurrence of a power path fault in any branch, a virtual ground moves to the site of the fault. In addition, an image virtual ground moves to a similar point in the branch that does not have the cable fault. As a result of this implementation, the cable power system is able to tolerate at least one fault in a branch without necessitating repair, and can tolerate some multiple branch faults depending upon their location. In contrast to the operation of existing power-switched branching units, the fault-tolerant branching unit does not require down-powering and re-powering in order in order to change the power configuration, e.g., to allow a virtual ground to be re-located at shunt fault sites that occur in either trunk or branches. Moreover, even with a branch shunt fault or cable break, the fault-tolerant branching unit allows for power to be removed from the faulted branch for repair without having to first power down the other two legs. And finally, at the completion of a branch repair, power to the repaired branch can be restored without first powering down the other two legs.

33 Claims, 11 Drawing Sheets

METHOD AND APPARATUS FOR OPERATING CABLED-FIBER UNDERSEA NETWORK, AND FAULT-TOLERANT BRANCHING UNIT FOR USE THEREIN

BACKGROUND OF THE INVENTION

The present invention relates generally to methods and apparatuses for powering undersea optical communications systems, and more particularly, to a method and apparatus for powering an undersea optical communication system employing multiple branching units.

Undersea optical communication systems include land-based terminals containing transmitters and receivers connected by a cabled-glass-transmission medium that includes periodically spaced repeaters, which contain optical amplifiers whose purpose is to compensate for the optical attenuation in the cabled fiber. As the repeaters are usually placed undersea and away from power sources, power must be supplied remotely to the repeaters. The cabled fiber therefore usually contains a copper conductor to carry electrical power to the repeaters from the terminals. These undersea systems serve to carry optical communication signals (i.e., traffic) between the terminals. The traffic on these systems can consist of voice, data, television, Internet traffic, international telephone traffic, etc. Consequently, the revenue lost when the system is down can be significant. Therefore, these systems must have high reliability and availability.

To provide increased flexibility in undersea network architecture beyond simple point-to-point interconnection between land-based terminal, a branching unit is provided, which allows traffic to be split or switched to/from multiple landing points. Conventional branching units typically manage the cabled-fiber interconnections and the power conductor paths among three cables. The latter is necessary to maintain as much traffic carrying capability when a fault occurs in one of the three cable legs, which increases the availability of the system.

The most common type of electrical undersea fault is a shunt, that is, a current leakage path that develops between the power conductor and the seawater without necessarily a break in the power conductor. A shunt fault is often the result of external aggression to the cable from fishing trawlers, ships' anchors and the like. At the site of a shunt fault, the optical glass fibers are often left intact, but sometimes are damaged as well.

Another common fault resulting from external aggression is a complete cable break, also referred to as a cable cut, where the power conductor is parted and generally exposed to seawater at both ends. Of course, the glass fibers in this case are broken and parted as well. When a shunt or broken cable fault occurs in a system containing branching units, it is often necessary to re-configure the powering in order to:

1) maximize the traffic carrying capability on the faulted portions without faults; and
2) maintain the portion containing the fault in an off-powered state and grounded so a repair can be made safely.

A power-switched branching unit is configured to allow re-routing of electrical power from the terminals in the presence of a fault in one of the cables, so that two of the three cable legs in a branched system can still be powered. Such a power-switched branching unit usually has three operating states: normal, alternate-normal, and grounded-trunk. The power-switched branching unit can be configured in any of these three states by the appropriate power-up sequencing from the terminals of the three legs.

One of the three cables connecting to a branching unit is known as the trunk and the other two as branches. In an existing undersea cable system containing a power-switched branching unit, in a normal powering state, current flows from the terminal connected to the trunk through the branching unit to one of the branches. At the branching unit, the other branch is grounded to enable it to be powered from the terminal to which it connects. Thus, the amount of current in each of the branches is the same as on the trunk. Refer to FIG. 1A, which illustrates this powering configuration. In an undersea communications system, the terminals are typically located on land and the branching units (along with the cable and repeaters) are typically located under water. As shown in FIG. 1A, the power circuitry in the branching units grounds one branch while allowing the current from the trunk to pass through to the other branch. Which branch power path is grounded at the branching unit and which is connected to the trunk power path depends on the sequence of power turn up from the terminals.

If a shunt fault occurs in the trunk or the branch powered via the trunk, the voltage applied from the corresponding terminals can be adjusted to provide a virtual ground (i.e., a point at which the voltage is zero Volts) at the fault site. With powerfeed equipment operated in the constant current mode, movement of the virtual ground to the fault site is automatic. Thus, traffic can be maintained (provided the fibers are not damaged) because no current is lost via the shunt path to ground. However, if the shunt fault occurs in the separately powered branch (which is grounded at the branching unit), there is no capability for placing a virtual ground at the fault site to maintain traffic carried via that branch. It is possible, however, to power down the system and re-power the equipment in the new configuration shown in FIG. 1B, such that a virtual ground can be placed at the fault site and all traffic can be maintained as before. Unfortunately, traffic is lost during the power reconfiguration. Thus, with a power-switched branching unit, it is necessary to power down the system before it can be re-powered in a new configuration. Naturally, all traffic carrying capability is lost when power is removed from the system. When the system contains more than one interconnected branching unit, the power down and power up sequences can be complicated, requiring communications and coordination among the different terminal stations. The necessary communications and coordination result in long power up sequences, during which revenue producing traffic cannot flow. Moreover, traffic may be lost in certain segments of the system that are adjacent to the fault. This loss in traffic occurs because removal of power to the adjacent branching units is required to reconfigure the branching unit with a faulted leg prior to undertaking repair operations, or when returning the branching units to the normal no-fault states upon completion of a repair.

The present invention is therefore directed to the problem of developing a fault-tolerant branching unit that does not require powering down and re-powering to change the power configuration, e.g., to allow a virtual ground to be re-located at shunt fault sites that occur in either trunk or branches. Moreover, the present invention is also directed to the problem of developing a fault-tolerant branching unit that, even with a branch shunt fault or cable break, allows for power to be removed from the faulted branch prior to repair without necessitating powering-down of the other two legs. In addition, the present invention is also directed to the problem of developing a fault-tolerant branching unit that, at the completion of a branch repair, enables restoration of power to the repaired branch without first powering-down the other two legs.

SUMMARY OF THE INVENTION

The present invention solves these and other problems by providing that each branch of the system be supplied with a current equal to half the current in the trunk and by coupling the power path of both branches to the trunk so that the current sums at the branching unit. As a result of the above provisions, upon occurrence of a cable fault in any branch, a virtual ground moves to the site of the cable fault, even in the branch with the fault. In addition, an image virtual ground moves to a similar point in the branch that does not have the cable fault.

As a result of this implementation, a system employing the techniques and apparatuses of the present invention is able to tolerate at least one fault in a branch without necessitating down powering and re-powering:

1) to maintain traffic (provided the fault is a shunt and the cabled glass fibers are not damaged);
2) to subsequently allow the branch containing the fault to be powered-down separately to ensure the safety of shipboard personnel during the repair operation while still allowing traffic to be carried over the portions of the system without a fault; and
3) to return to a normal powering configuration upon completion of a repair without affecting traffic being carried over the portion of the system without a fault.

DETAILED DESCRIPTION

System Implementation with Fault-Tolerant Branching Unit

Figure 1A:
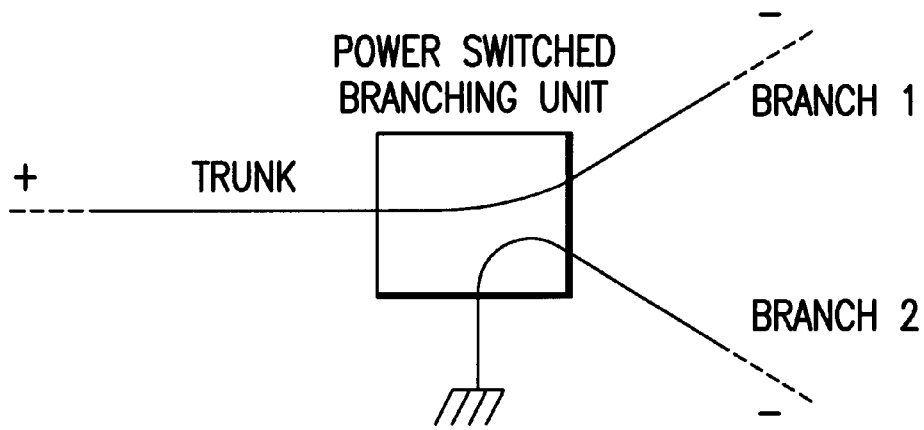
FIG. 1A depicts a block diagram of a conventional single power-switched branching unit showing the powering arrangement for the trunk and branches.
Figure 1B:
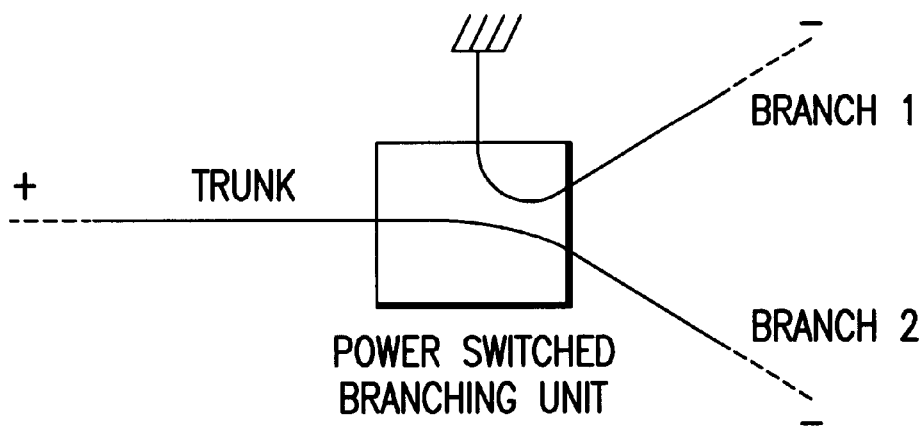
FIG. 1B depicts a block diagram of an alternate powering arrangement for the conventional power-switched branch shown in FIG. 1A.
Figure 2:
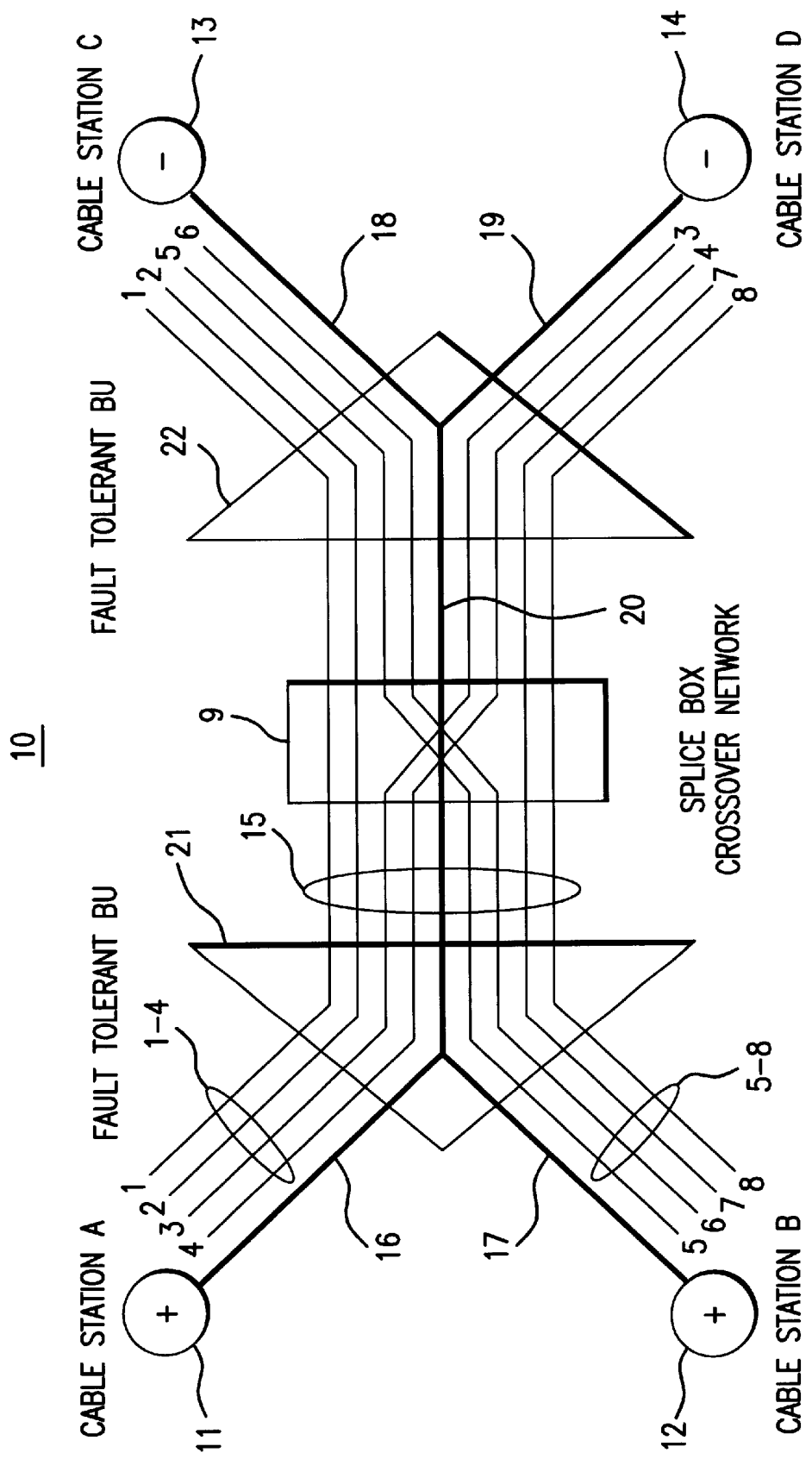
FIG. 2 depicts a block diagram of an exemplary embodiment of a system employing fault-tolerant branching units according to one aspect of the present invention.

The system 10 depicted in FIG. 2, which interconnects four stations 11, 12, 13 and 14 over a single trunk 15, implements fault-tolerant electrical powering. The configuration shown in FIG. 2 enables a continuous connection from cable station A 11 to cable stations C 13 and D 14 even in the event of a cable fault in branch 17, for example. As most cable faults occur in the segment of the system from the edge of the continental shelf to the landing (which are usually served by branches, such as 16, 17, 18 or 19), enabling continuous connection even in the event of a branch cable fault significantly improves the reliability and availability of the entire system. Moreover, as alternate connections (shown as dotted lines 24, 25) between cable stations A 11 and B 12 can be provided over land line networks in the event of a cable break, traffic may still be able to flow from cable station B 12 to cable stations C 13 and D 14 even with a break in the branch 17. In addition, the configuration shown in FIG. 2 requires only a single cable to be laid across the ocean in contrast to traditional dual cable systems necessary to provide similar reliability and availability. Elimination of a single transoceanic cable can have a significant cost reduction on the installation costs (and capital investment costs) of such a system.

Fault-tolerant electrical powering enables the cabled-fiber system 10 to survive single branch shunt faults (i.e., a fault in branches 16, 17, 18 or 19) without losing any traffic in the system 10 (provided the cabled fibers are not damaged), except during repair of the fault. Moreover, the fault-tolerant electrical powering according to this aspect of the present invention enables the system to survive single-branch complete cable breaks (i.e., breaks in branches 16, 17, 18 or 19) while only losing the traffic carried in the faulted branch 16, 17, 18 or 19.

A second fault can also be tolerated before the first fault is repaired. For example, if a single fault occurs in branch 16, a second fault can be tolerated if it occurs in branches 17, 18 or 19. However, if the first fault occurs in branch 16, for example, a second fault in branch 17 could be tolerated by the system 10, but not repaired until the repair of the first fault is completed in branch 16. Similarly, if the first fault occurs in branch 17, for example, a second fault in branch 16 could be tolerated by the system 10 but not repaired until the repair of the first fault is completed. If a single fault occurs in branch 16 or 17, a second fault in branch 18 or 19 can be tolerated and repaired simultaneously with the first fault. The same is true for two faults in branches 18 and 19.

The system 10 can also survive a shunt fault in the trunk 15 and maintain traffic (provided the cabled fibers are not damaged), but during the repair operation the trunk must be powered-down with the concomitant loss of trunk traffic until the repair is complete. If the trunk cable 15 is completely broken (i.e., both power conductor 20 and fibers 1–8 are parted), the system 10 is out of service until a repair is completed.

An exemplary embodiment of a system 10 of the present invention uses branching units 21 and 22, which support fault-tolerant operation and are normally electrically powered from both sides simultaneously. That is, power is supplied to branching units 21 and 22 from cable stations A–D 11–14 via power conductors 16–20. Furthermore, the powering from the branches is additive and provides the powering for the trunk 15. The repeaters (not shown) in the trunk 15 are designed to carry twice the electrical current as the repeaters in the branches 16–19.

To repair a failed branch, the branching unit 21, 22 can be controlled to switch the faulted branch to ground at the branching unit. Then, the power feed equipment (PFE) supplying power to this branch is turned down and grounded. These actions are necessary to support industry-wide safety standards and practices while the repair operation is underway. As power is removed during the repair, no traffic can be carried over the faulted branch at this time. Upon completion of the repair, the full system traffic is restored with minimum effect on existing traffic by reversing the steps above. In other words, the full system traffic will not be affected during the repair, during preparations for the repair, as well as during power restoration to the repaired branch. As used herein, the term co-branch, will be used to describe the (un-faulted) branch that is on the same side of the system as the faulted branch. For example, if the system 10 has a single fault in branch 17, the co-branch is branch 16.

Fiber Connectivity

In FIG. 2, lines 1–8 represent fiber pairs. The design in FIG. 2 is based on a balanced layout of fiber pairs: four fiber pairs in each branch (1–4 in branch 16 and 5–8 in branch 17) and eight fiber pairs 1–8 in the trunk 15. Since the branching units 21, 22 are fiber branching units, interconnections between the four branch stations are flexible and alternate fiber configurations can be supported provided that the 4:8 branch to trunk fiber pair relationship is maintained. Other fiber configurations are possible, however, without departing from the spirit or scope of the present invention.

In FIG. 2, a fiber crossover splice 9 can be used to establish the specific connectivity between the terminals at the opposite ends of the system. Note that interconnection between branches on the same side (11–12 and 13–14) is not shown, but can be supported as is known in the art.

Electrical Connectivity

Figure 3:
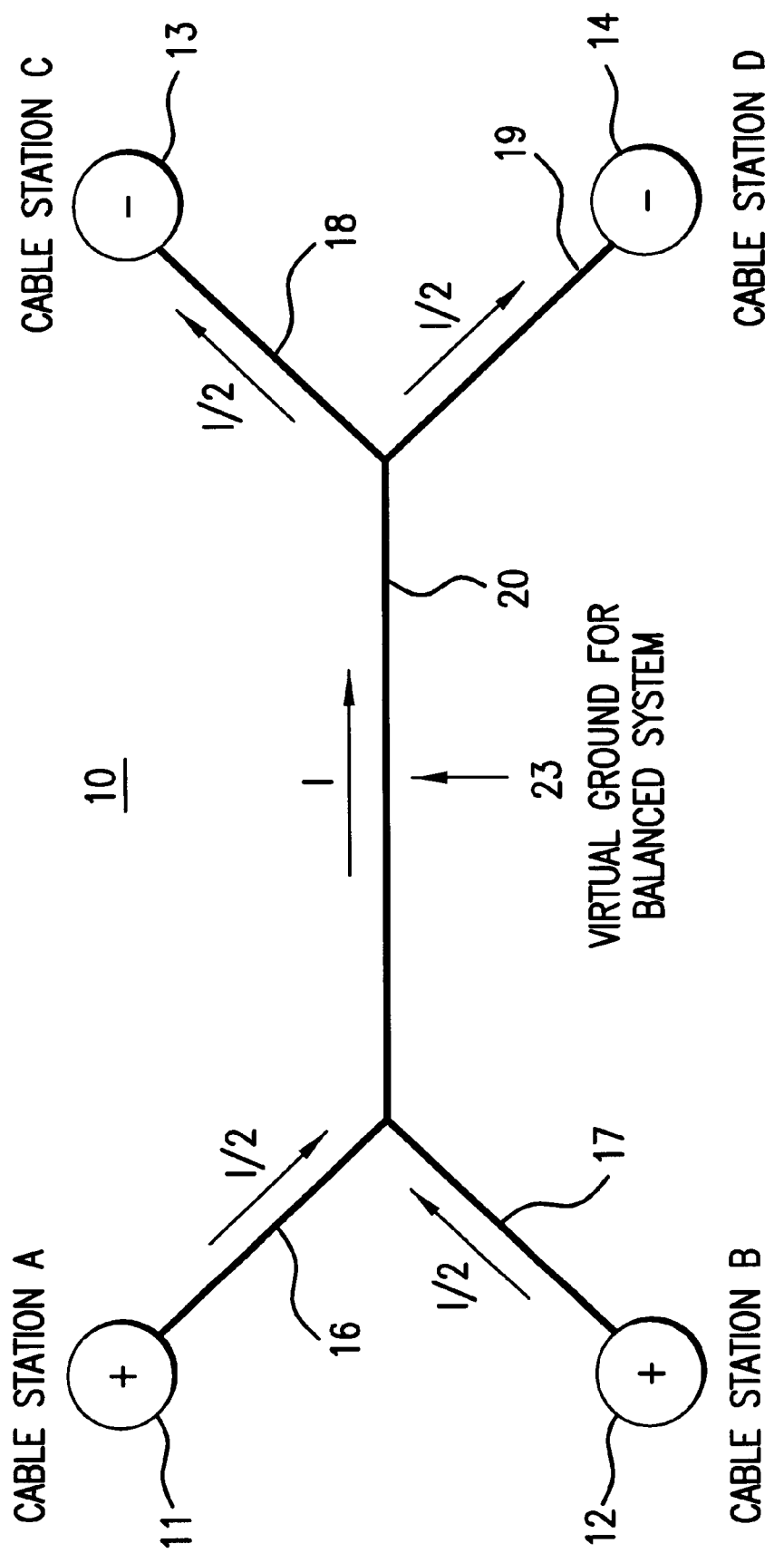
FIG. 3 depicts the powering arrangement of the system of FIG. 2 in a normal operating state according to another aspect of the present invention.

In FIG. 2, line 20 represents the trunk power conductor. Lines 16 and 17 represent branch power conductors on the AWest@ and lines 18 and 19 represent branch power conductors on the AEast@. As is evident in FIG. 2, there is no sea-ground connection made at either branching unit 21, 22. Therefore, the powering scheme used in this system 10 of the present invention differs from the conventional power-switched method used in typical trunk and branch networks. Rather, the two terminal stations powering a branching unit of the system 10 have the same polarity PFE. That is, both AWest@ branch stations 11, 12 have positive voltage-based PFEs while both AEast@ branch stations 13, 14 have negative voltage-based PFEs. The electrical currents from the two west branches 16, 17 add and provide the electrical current into the trunk 20. This current is then split into the east branches 18, 19 (see FIG. 3).

Operational Characteristics

When the system 10 is operating normally, the electrical current on each of the branches 16, 17 is half the electrical current carried on the trunk 20. These electrical current levels will be supported even in the event of a fault. The only time this changes is during the repair of a branch, which is discussed below.

To support this electrical current flow arrangement, the repeaters (not shown) in the branches are designed to carry 50–100% of the electrical current as the repeaters (not shown) in the trunks. For example, the trunk repeaters (not shown) can have their electrical power circuits for the pump lasers connected in parallel, whereas the branch repeaters (not shown) may have the electrical power circuits for the pump lasers connected in series.

Figure 8A:
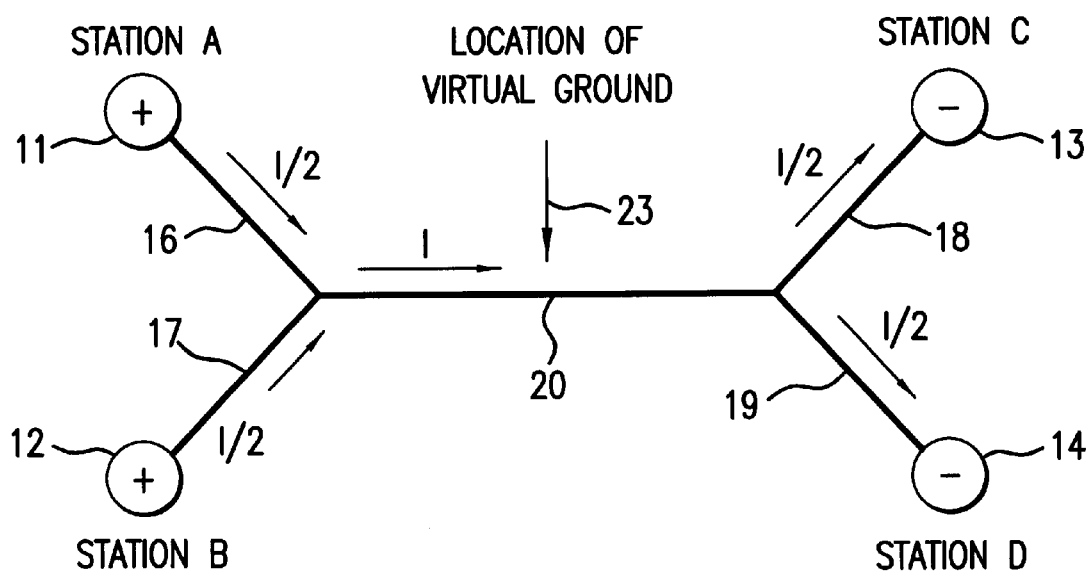
FIG. 8A depicts the normal operating state of the cable system employing the fault-tolerant branching unit according to yet another aspect of the present invention.
Figure 8B:
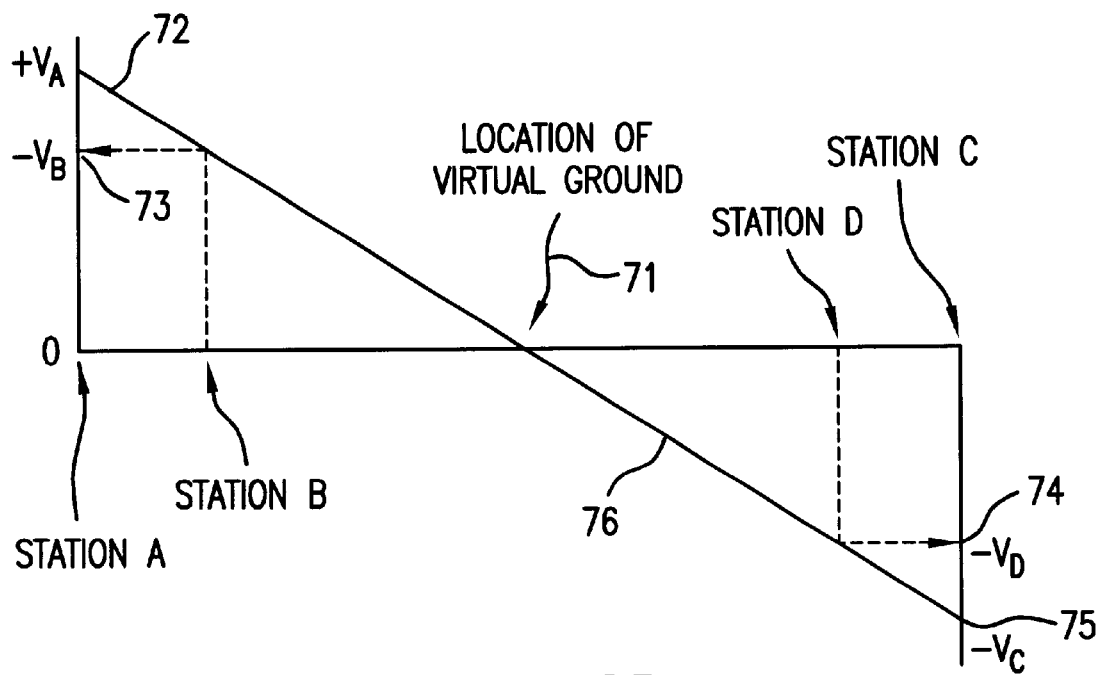
FIG. 8B depicts the voltage profile of the system as depicted in FIG. 8A.

Under normal operating conditions, it is expected that the PFE voltages will be set to place a virtual ground 23 (see FIG. 3) in the trunk 20 near the center of the system 10. FIG. 8B shows the voltage profile for the system 10 employing the fault-tolerant BU configuration as shown in FIG. 8A under normal no-fault powering. In particular, the lengths of the two branches on each end of the system 10 are shown as unequal to represent the more general case. In this powering state, the virtual ground 23 (i.e., the point 71 at which the voltage curve 76 passes through zero) is located near the middle of the system 10. The voltage curve 76 begins at the larger of the positive PFE voltages ($V_A$) supplied by the cable stations 11 over branch 17, which is the longer of the two AWestern@ branches, passes through zero near the middle of the trunk and ends at the more negative voltages ($-V_C$) supplied by the cable stations 13 over branch 18, the longer of the two AEastern@ branches.

Figure 9A:
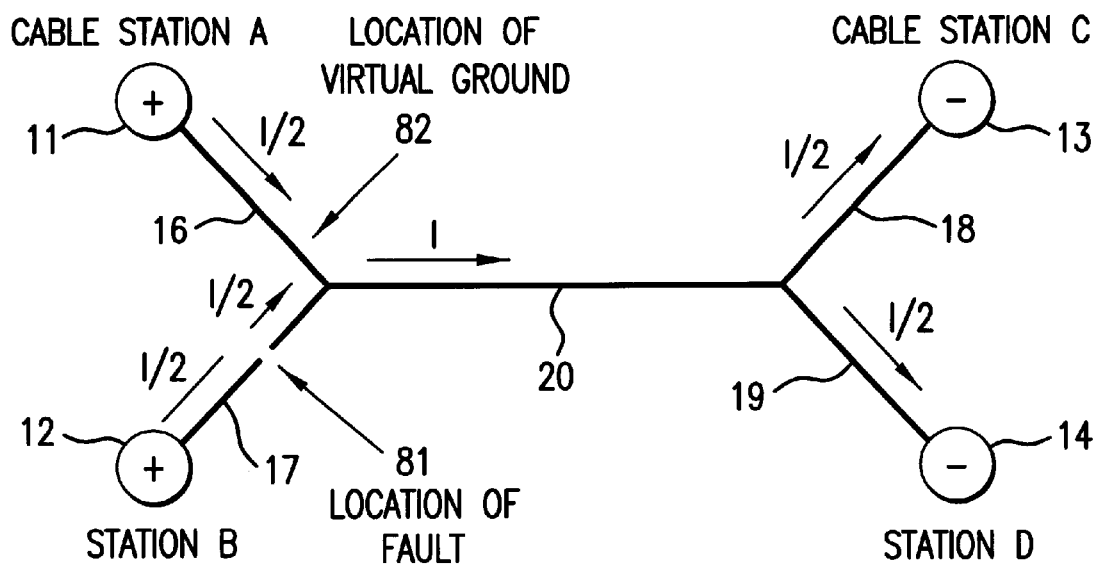
FIG. 9A depicts the single fault operating state of the cable system employing the fault-tolerant branching unit according to yet another aspect of the present invention.
Figure 9B:
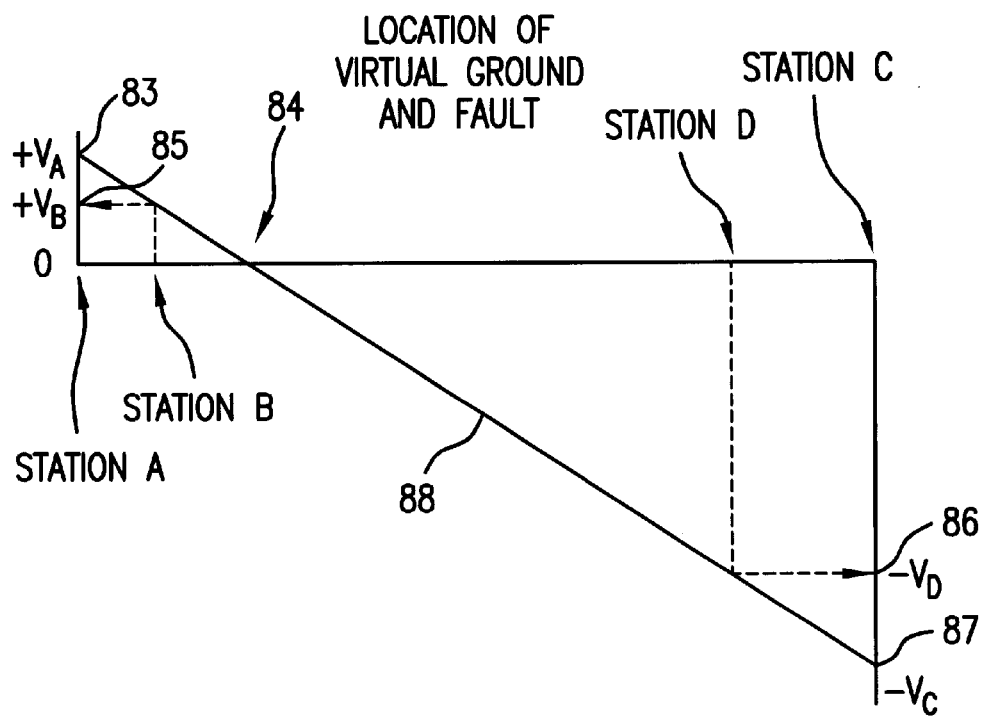
FIG. 9B depicts the voltage profile of the cable system as depicted in FIG. 9A.
Figure 10:
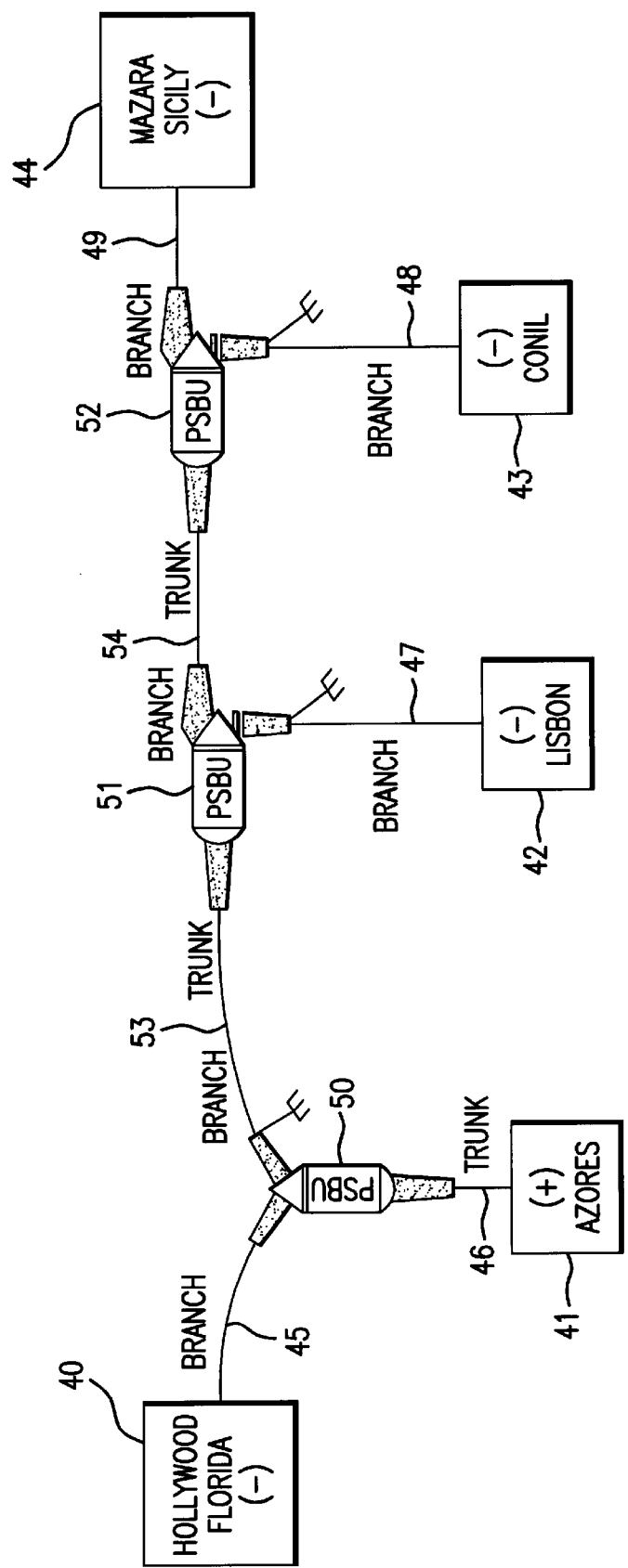
FIG. 10 depicts a trunk and branch optical communications network to which the present invention is applicable.

Upon a fault in any branch, the constant-current operation of the PFEs will tend automatically re-adjust their voltages to position the virtual ground at the fault site 31 (see FIG. 3), no matter in which branch the fault occurs, in contrast to the prior art systems containing power-switched branching units, in which case it is not possible to move the virtual ground to the site of the fault. A consequence of this activity is that a second virtual ground 32, also termed an image ground, (see FIG. 3) will be located in the un-faulted co-branch 16 at the same distance from the branching unit as the actual fault 31. Once the electrical transient associated with the movement of the virtual ground has completed, the currents will stabilize to their normal operating value, i.e., twice the electrical current in the trunk 20 as the branches 16–19. An example of the voltage profile when a power-path fault occurs in one of the branches (for the system shown in FIG. 9A) is shown in FIG. 9B. In this case, the fault type can be a shunt or a broken cable. The four power-feed equipment currents are the same as they are under normal operation, so the voltage at the fault site 81 becomes zero (point 84 on the voltage curve 88) because no current flows through the fault path to ground. Therefore, unknown fault resistance is not a concern from a fault location standpoint. One can estimate the fault location 81 by scaling the power feed equipment voltages with system length. Knowledge of the per-unit-length voltage drop of the cable and of the voltage/current characteristic of the repeater can also be used to calculate more accurately the precise location of the fault. This reduces the length of the repair operation by enabling the cable repair ship to travel more quickly to the precise location of the fault, as opposed to traveling to a more generalized section of the cable, which may contain the fault.

As evident in FIG. 9B and due to the constant current operation of the PFE, the positive voltages being supplied by the cable stations 11, 12 are reduced to output the same current (I/2) in the branches 16, 17. Similarly, the negative voltages being supplied by the cable stations 13, 14 are increased in magnitude (i.e., made more negative) to maintain the same current (I/2) in the branches 18, 19. If the fault is a shunt without damage to the fiber, no traffic will be lost. There may be transmission errors, however, due to transients arising during the transition period. The transition period occurs that the virtual ground transitions to its new position, i.e., from a position in the middle of the trunk (see FIG. 3, element 21) to a position at the fault site and the mirror image in the co-branch (see FIG. 4, element 31). If the fault 31 is a complete cable break, traffic will be lost in the faulted branch 17 although the electrical currents will again stabilize to their normal operating point and a virtual ground will be located at the fault site, with a mirror image in the un-faulted co-branch.

Figure 5:
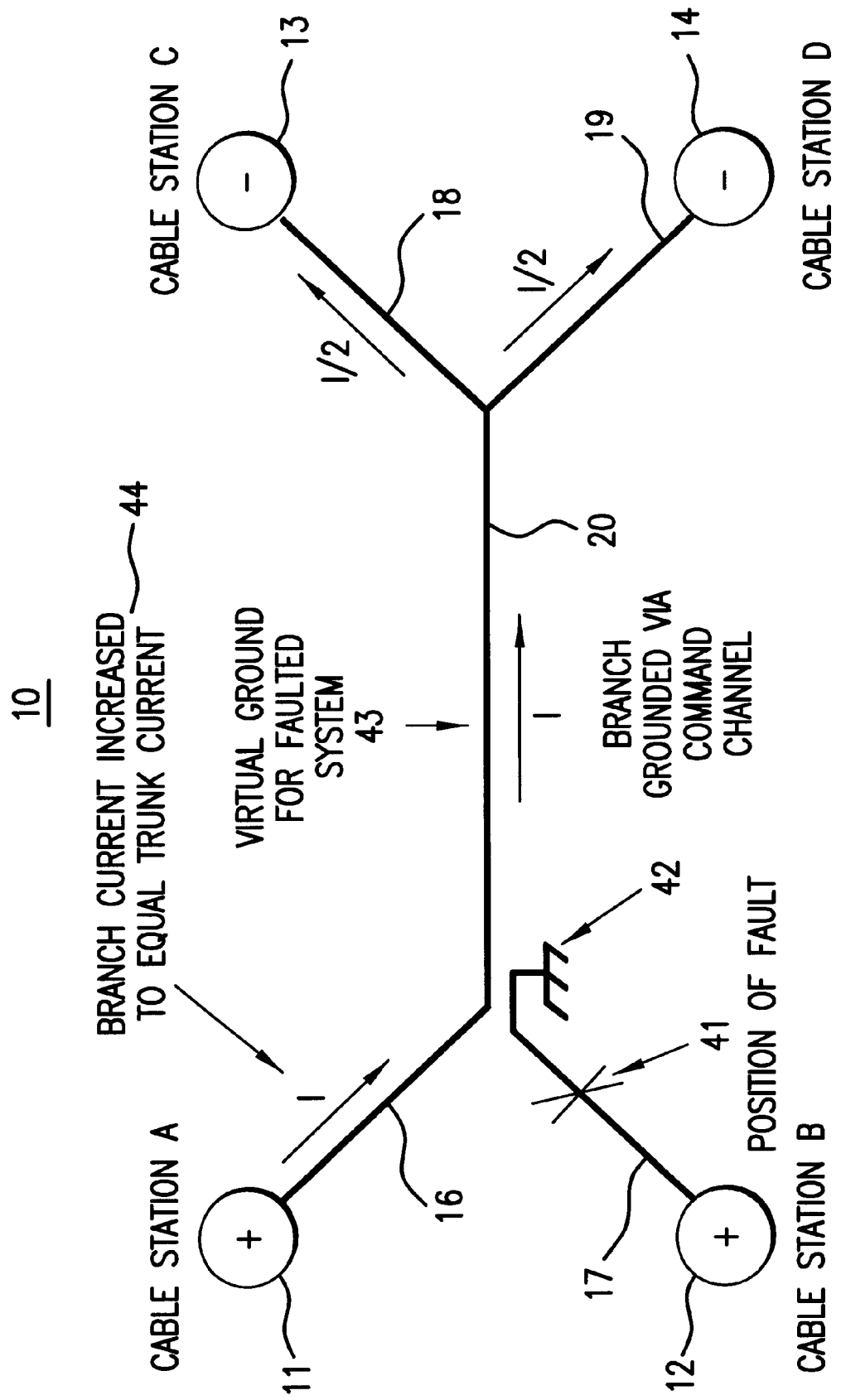
FIG. 5 depicts the powering arrangement of the system of FIG. 2 in a single fault repair operating state according to another aspect of the present invention.

When a repair of either a shunt fault or a cable break in a branch is to be performed, power is removed from the faulted branch and its power conductor will be grounded at the branching unit and the corresponding terminal station (As shown in FIG. 5). This will be achieved using an optical command channel from the shore to the branching unit, as is disclosed in U.S. patent application Ser. No. 09/460,011, which is hereby incorporated by reference as if repeated herein in its entirety, including the drawings. In addition, the PFE at the co-branch (see FIG. 5, element 16) will have to be re-adjusted to support normal electrical current levels in the rest of the system 10. In other words, the current in the co-branch 16 must be increased to equal the normal current in the trunk 20, as the current in the co-branch 16 is now the only source of current in the trunk 20 due to the removal of power from and the grounding of the branch 17. Consequently, the repeaters in a cable branch 16, 17, 18 or 19 must be able to handle currents from 50% to 100% of the current in the trunk, but the repeaters in the trunk need only be able to handle a single current value.

A second branch fault (see FIG. 6, element 52) at the opposite side (either branch 18 or 19) of the system 10 can also be tolerated without loss of traffic in the remaining two un-faulted branches and the trunk, while the first fault 41 is being repaired (i.e., isolated from the system with a power conductor ground at the branching unit). If the second fault is a shunt with no fiber damage, traffic can be maintained in this branch as well.

System Powering Arrangements
Powering Procedures

Powering procedures for systems employing the fault-tolerant branching units are themselves very tolerant. This results from the fact that, in systems using this type of branching unit, it is not necessary to follow a given power-up sequence to achieve a given powering configuration. Any changes needed in the power switching arrangement within a given branching unit to achieve a given system-powering configuration are set by optical commands sent during initial power-up or at the start or end of a repair operation. The branching unit power configuration is then Astored@ or Alatched@ within the branching unit itself and remains in effect until changed by means of an optical command, even if the branching unit is powered down.

Nevertheless, it is suggested that the procedure given below be used, for powering up both normal systems and systems with power-path faults to avoid confusion and to insure rapid re-configurations, when they become necessary to facilitate a repair.

Powering Procedures for Normal or Fault Free Systems

As shown in FIG. 2, cables stations 11, 12 on one end of a system 10 have positive polarity and cable stations 13, 14 on the other end have negative polarity. Initially, before the power-up procedure begins, the current limit of each PFE should be set to I/2 as shown in FIG. 2. Since only the positive PFEs can source current, the stations 13, 14 with negative polarity should be ramped up, one at a time or simultaneously, to the full voltage needed to achieve the desired line current levels. This is possible because the PFEs maximum voltages have been specified to support Asingle-end-feed.@

After this is done, the PFEs on the other side of the system are ramped up to the same total system voltage levels. This ensures that single-end-feed can be carried out, if necessary, from either end of the system. When this has been done, the actual operating voltages of the various PFEs will automatically re-adjust to roughly one-half of the total system voltage (positive on the one end and negative on the other end of the system) and the current levels at the various PFEs will be one half of the trunk currents as shown in FIG. 2. In addition, the PFE voltages can be adjusted to place a virtual ground potential 23 (0 Volts) near the middle of the cable system 10.

Description of Power-Path Fault Types

Cable power path faults most often result from external aggression to the cable system 10, e.g., from fishing gear of trawlers, or ship's anchors. Such faults fall into two categories:

1) shunt (or insulation) fault, wherein the cable power conductor remains intact, but a low resistance path occurs between the power conductor and the seawater, and 2) a completely broken cable, wherein the power conductor is separated. In the case of a shunt fault, the cabled fibers at the fault site are often undamaged, but can be damaged/broken as well. In the case of a broken cable, the fibers are, of course broken as well. In almost all cases of broken cable, the power conductor at each end is exposed to seawater. On rare occasion one of the cable ends will have a Asealed@ conductor, i.e., open circuited and not exposed to seawater.

The treatment of these two types of power-path faults is different because of the different affect that they have on the continuation of traffic in a system. When a shunt fault occurs but the fibers remain intact, it is possible to maintain service over the entire system while the repair operation is being organized. However, when a cable break occurs, service can be maintained only on those portions of the system, which remain integrally connected together.

One of the important characteristics of systems using the fault-tolerant branching units of the present invention is that not only single power-path faults but also some multiple branch faults can be tolerated with at least some traffic remaining without going through a down-powering and re-powering sequence, wherein all traffic is lose during the power re-configuration sequence. Such cases are discussed below.

Figure 4:
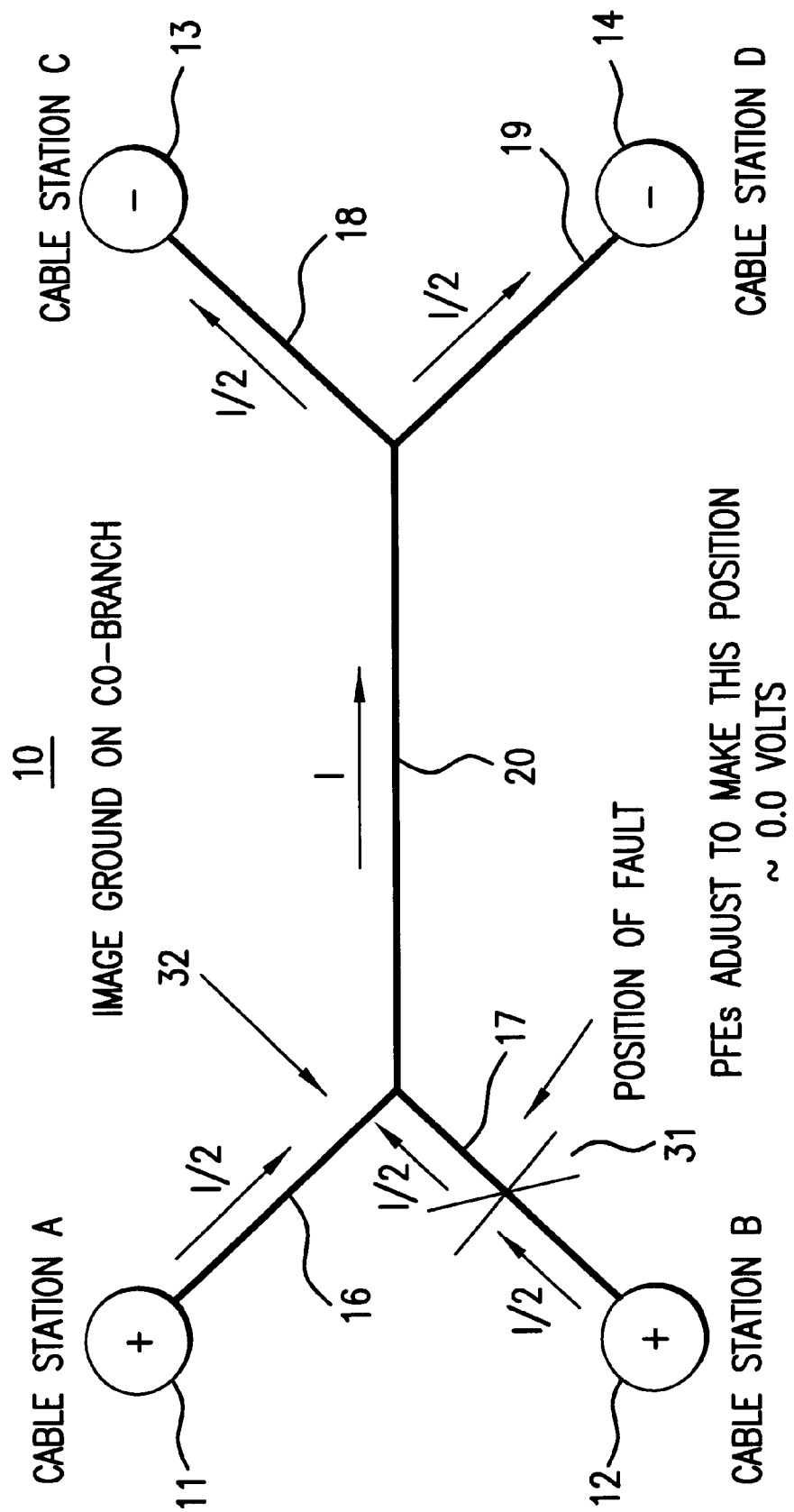
FIG. 4 depicts the powering arrangement of the system of FIG. 2 in an operating state in which there is a single fault according to another aspect of the present invention.

Single Cable Power-Path Faults
Power Path Faults in Branches Involving Cable Shunts and Broken Cables When a fault 31 (see FIG. 4), either a cable break or a shunt, occurs in a branch 17, on either the AWestern@ or AEastern@ end of the system, a physical Asea-ground@ ground@ is created at the site of the fault 31. For cable shunts, the constant current value that has been set in various PFEs causes the PFE voltages to automatically re-adjust such that there is 0 Volts (a virtual ground) at the fault 31 as shown in FIG. 4. Only at this voltage state will the currents in all the PFEs remain at their constant-current value.

In this case, no net current flows through the shunt path into the ocean, ensuring that no electro-chemical corrosion of the power conductor and the steal strength members of the cable occurs at the fault site. Were this not the case, corrosion and heat generation caused by current flowing through the shunt path could damage fibers that would otherwise remain intact. When the fibers remain intact, service over the entire system can continue uninterrupted by the presents of the shunt fault until a repair can be organized.

In the event that the fault 31 is a completely broken cable, only service in those portions of the system 10 that remain interconnected (i.e., branches 16, 18 and 19 and trunk 20) can be continued. Current flow in the separate ends of a parted cable allow fault location procedures to be carried out using the line monitoring equipment and/or a coherent optical time domain reflectometer, for example. Note that FIG. 4 also shows that a mirror image virtual ground 32 is created in the co-branch 16 at a point corresponding to the position of the fault 31 in the faulted branch 17. This is true for either a shunt fault or complete cable break.

When a repair is to be carried out, the constant-current value 44 on the co-branch 16 (see FIG. 5) is raised to the normal current level in the trunk 20. In addition, the PFE voltages are adjusted to locate the virtual ground at the branching unit (to eliminate power-path switching at high voltage). Furthermore, an optical command is issued over the optical communications channel (discussed above) to switch the branching unit's powering configuration to that shown in FIG. 5. Note that after the power path reconfiguration has taken place the system voltages can be re-adjusted to again place the virtual ground potential 43 at or near the middle of the system 10. This configuration provides that the failed cable section 17 is grounded 42 on both ends and ensures that the repair operation can be carried out safely from the point of view of repair ship personnel. Such adjustments can be carried out with no effect on the traffic in the remainder of the system (i.e., branches 16, 18 and 19 and trunk 20). Only traffic in the branch 17 to be repaired is affected.

If the fault in the branch is a cable break, traffic in branch 17 cannot be supported. Isolating and grounding the power conductor 42 at the branching unit can be carried out at any time after the fault occurs up to the time of the repair. However, if the fault is a shunt with undamaged fibers, such a reconfiguration should be carried out only when all preparations have been made and the repair ship is on site ready to undertake the repair activity. This ensures a minimal traffic interruption.

After the repair, the virtual ground movement and branching unit power-path switching is carried out in reverse order to return the powering configuration to normal. Note that this procedure can be done with no effect on existing traffic.

Power-Path Faults in the Trunk Involving Cable Shunts and Cable Cuts

Because power-path faults almost always result from external aggression in relatively shallow water, power-path faults in the trunk section 20 in deep water are rare. However, if a shunt does occur in the trunk, the PFE voltages will automatically re-adjust to place the virtual ground at the site of the fault and traffic can be maintained, provided fibers remain intact, until a repair is made. Since, as shown in FIG. 2, no branch-to-branch traffic is supported (in the exemplary embodiment, but could be done optionally); no provision is needed to support branch-to-branch traffic during a repair operation. If a trunk cable break occurs, fiber connectivity is lost and traffic can not be reestablished over the system 10 until a repair is carried out.

Multiple Power-Path Faults

Second Failure—Under certain conditions, systems employing the fault-tolerant branching units of the present invention can continue to carry traffic with little or no disruption even if multiple certain power-path faults were to occur. If, while a system is in the configuration shown in FIG. 5, a second power-path fault 52 (see FIG. 6), either a cable break or a shunt fault, where to occur in one of the two remaining branches 18, 19 at the other end of the system 10, as shown in branch 19 in FIG. 6, the voltages would re-adjust to create a virtual ground at the site of the second fault 52 (and a mirror image virtual ground 51 in the co-branch 18) and the current levels shown in FIG. 6 would be maintained.

Figure 7:
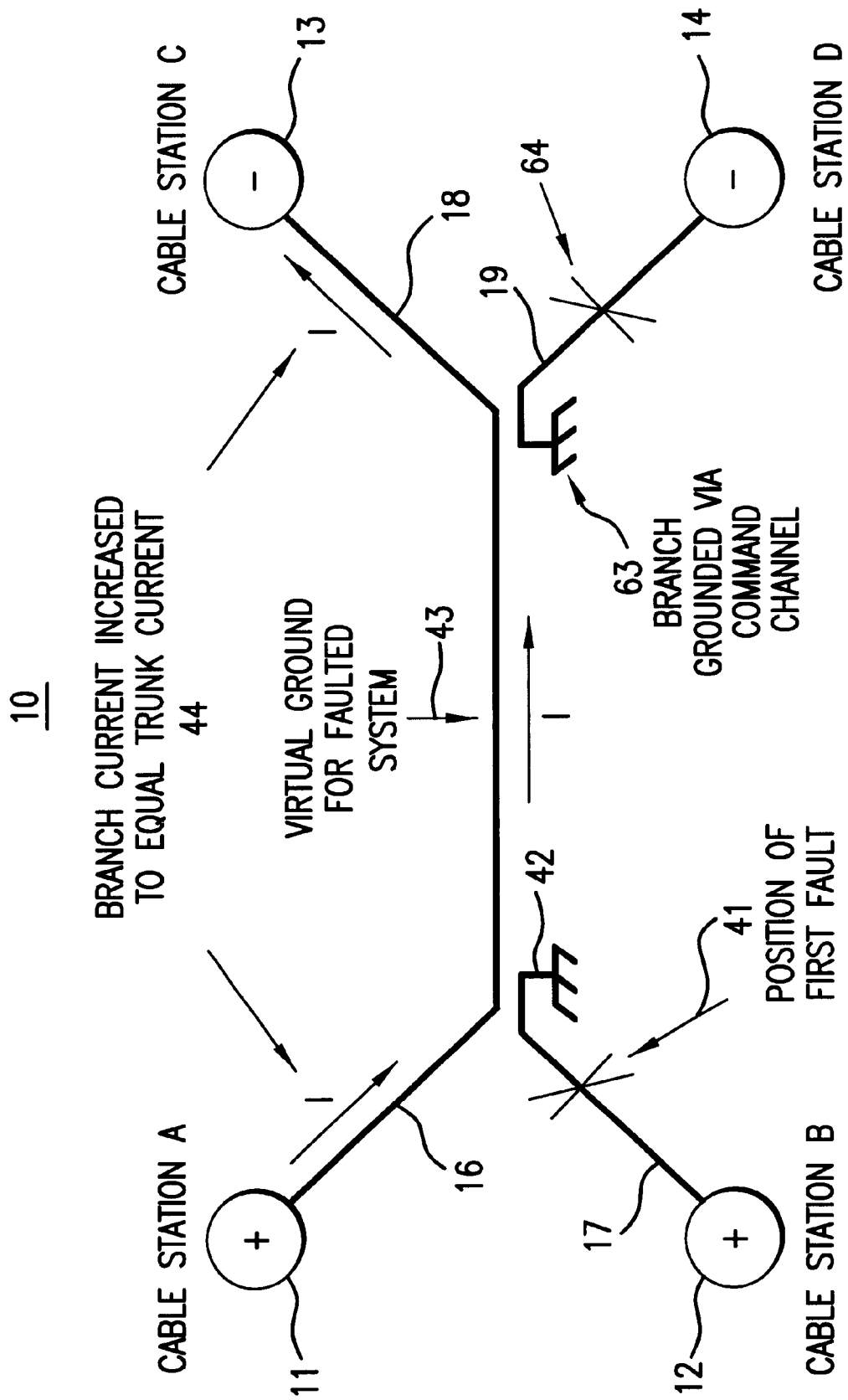
FIG. 7 depicts the powering arrangement of the system of FIG. 2 in a second fault repair operating state according to another aspect of the present invention.

If the fault 15 in branch 19 is a shunt (with fibers intact), traffic can be maintained in the remaining part of the system (i.e., branch 16, trunk 20, and branches 18 and 19), or if the fault is a cable break in the remaining part of the system that is still interconnected (i.e., branch 16, trunk 20, and branch 18). The repair scenario would be similar to that with a fault in branch 17, with the system being placed into the configuration shown in FIG. 7 while the actual repairs are being carried out (i.e., branch 19 is coupled to ground 63).

Figure 6:
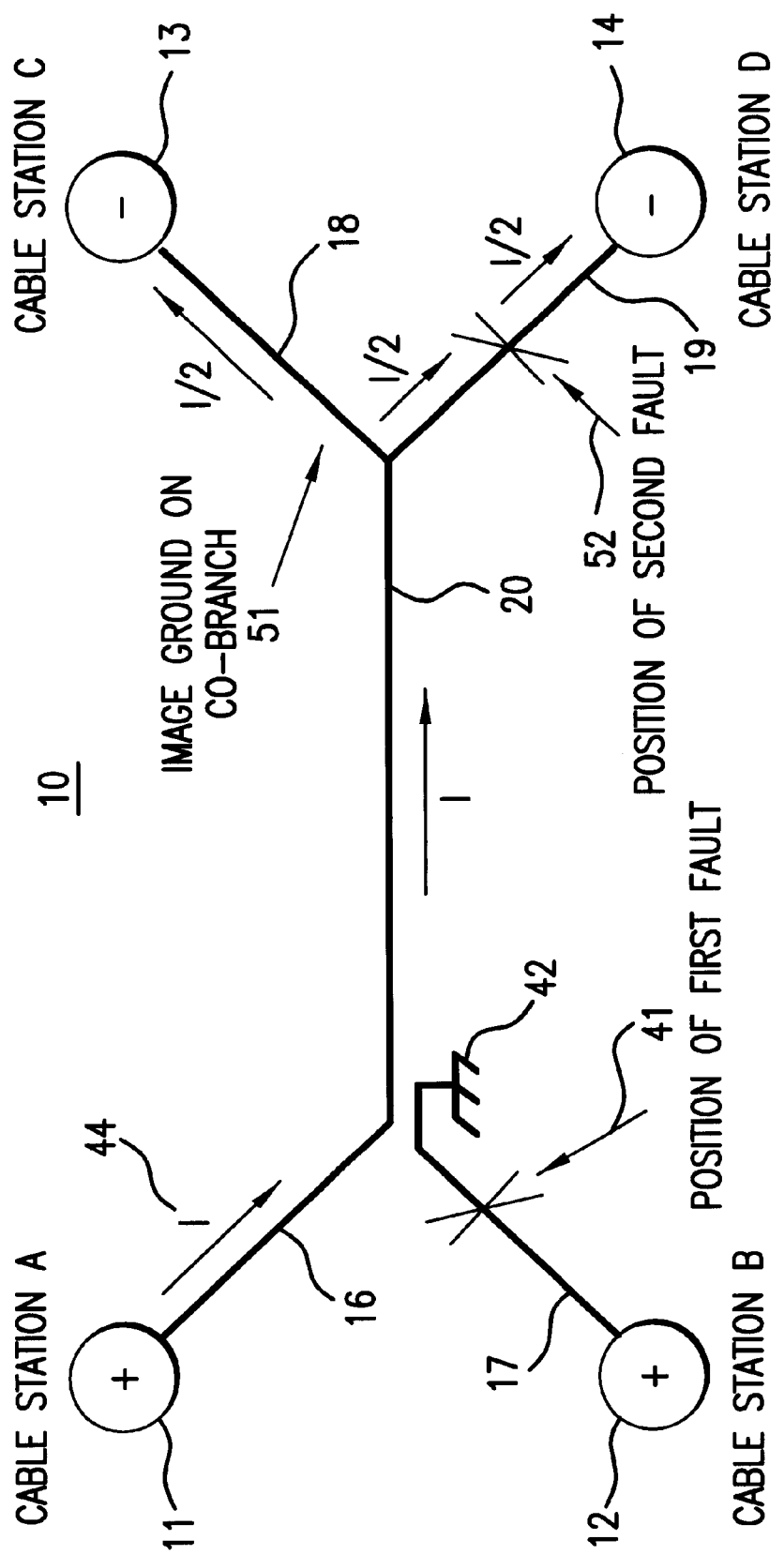
FIG. 6 depicts the powering arrangement of the system of FIG. 2 in a operating state in which there are two faults according to another aspect of the present invention.

Third Failure—Note that if, while the system is in the configuration shown in FIG. 6, a cable shunt were to occur, either in the trunk 20 or in one of the two remaining operating branches 16 or 18, the PFE voltages would automatically readjust to place a virtual ground at the site of the fault and traffic could be maintained (provided the fibers remain intact) until the repair of this fault can be carried out. If the fault were a complete cable break, all traffic would be lost until a repair could be carried out.

Figure 11:
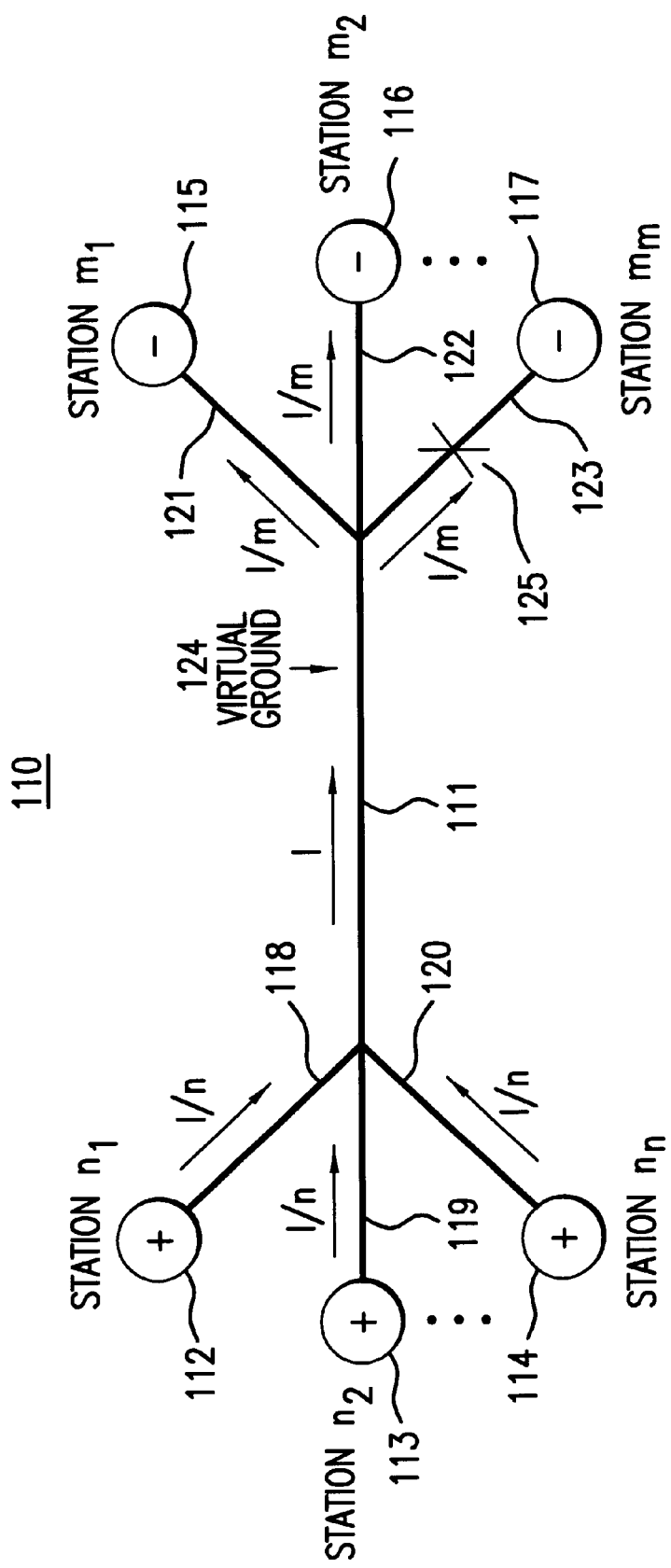
FIG. 11 depicts an exemplary embodiment of one aspect of the present invention for use in a generalized cable system, in which the number of branches at each end may vary.

FIG. 11 depicts a generalized cable network in which there are multiple cable stations at each end. In this embodiment, there are 'n' cable stations at the positive supply voltage end and 'm' cable stations at the negative voltage supply end of the cable network. In this embodiment 'n' and 'm' can take on any non zero integer values, e.g., 1, 2, 3, . . . . As such the currents flowing in the branches must sum to the current in the trunk. One possible embodiment of the currents in the branches is that the currents in the branches are approximately equal on each side of the cable network. For example, the currents in the positive supply voltage end of the cable network could each equal I/n, where 'n' is the number of branches in the positive supply voltage end of the network. On the negative supply voltage end of the network, the currents must also sum to the trunk current, as the trunk current must be split into each of the branches. One possibility is that the currents on the negative supply voltage end of the network are approximately equal, so that each current in the branches on the negative supply voltage end of the cable network is I/m, where 'm' is the number of branches in the negative supply voltage end of the cable network. Alternatively, the currents in each of the branches could be different values, as long as the currents in the branches at each of the ends sum to the trunk current.

As shown in FIG. 11, cable stations $n_1$, $n_2$ and $n_n$ (112, 113 and 114, respectively) each are powered by a current I/n, where I is the current in the trunk 111. At the negative supply voltage end of the cable network, cable stations $m_1$, $m_2$ and $m_m$ (115, 116 and 117, respectively) are powered by currents I/m. As before, a virtual ground 124 exists in the trunk, sometimes approximately in the center of the trunk, depending upon the lengths of cable involved and the values of the positive and negative supply voltages being used at the cable stations 112–117. Upon occurrence of a power path fault, the virtual ground moves to the site of the fault 125 as the currents are maintained and the supply voltages are adjusted to maintain the currents. Mirror grounds occur in branches 121 and 122, (not shown) as explained above.

What is claimed is:

1. In a cable network having four cable stations, a first cable station and a second cable station of which four cable stations are coupled to a first branching unit via a first branch and a second branch, respectively, a third cable station and a fourth cable station of which four cable stations are coupled to a second branching unit via a third branch and a fourth branch, respectively, and the first and second branching units are coupled together via a trunk, a method for powering the cable network comprising the steps of:
   a) supplying a first current from the first cable station to the first branching unit of the cable network;
   b) supplying a second current from the second cable station to the first branching unit of the cable network; and
   c) adding the first and second currents at the first branching unit to obtain a third current, which is twice the first current and twice the second current; and
   d) supplying the trunk with the third current.

2. The method according to claim 1, further comprising the step of splitting the third current into two currents of equal magnitude at the second branching unit.

3. The method according to claim 1, further comprising the steps of coupling a first positive voltage source to the first branch, and coupling a second positive voltage source to the second branch.

4. The method according to claim 3, further comprising the steps of coupling a first negative voltage source to the third branch, and coupling a second negative voltage source to the fourth branch.

5. The method according to claim 4, further comprising the step of selecting values of the first, second, third and fourth voltage sources so that a virtual ground can exist at a point approximately in a middle of the trunk.

6. The method according to claim 5, further comprising the step of maintaining the values of the first, second third and fourth voltages in the event of a power path fault so that the virtual ground moves to the site of the fault.

7. In a cable network including at least four cable stations, a first cable station and a second cable station of which four cable stations are coupled to a first branching unit via a first branch and a second branch, respectively, a third cable station and a fourth cable station of which four cable stations are coupled to a second branching unit via a third branch and a fourth branch, respectively, and the first and second branching units are coupled together via a trunk, an apparatus for powering the cable network comprising:
   a) a first voltage source disposed at the first cable station, being coupled to the first branch and supplying a first current to the first branching unit of the cable network via the first branch;
   b) a second voltage disposed at the second cable station, being coupled to the second branch and supplying a second current to the first branching unit of the cable network via the second branch; and
   c) a current adder disposed in the first branching unit adding the first and second currents to obtain a third current, which is twice the first current and twice the second current, and outputting the third current to the trunk.

8. The apparatus according to claim 7, further comprising a current splitter disposed in the second branching unit, splitting the third current into a fourth current and a fifth current having approximately equal magnitude, outputting the fourth current to the third branch, and outputting the fifth current to the fourth branch.

9. The apparatus according to claim 7, further comprising a first positive voltage source disposed in the first cable station and coupled to the first branch, and a second positive voltage source disposed in the second cable station and coupled to the second branch.

10. The apparatus according to claim 9, further comprising a first negative voltage source disposed in the third cable station and coupled to the third branch, and a second negative voltage source disposed in the fourth cable station and coupled to the fourth branch.

11. The apparatus according to claim 10, wherein each output voltage of each of the first and second positive and negative voltage sources are set so that a virtual ground exists at a predetermined point the cable system.

12. The apparatus according to claim 11, wherein the first and second positive and negative voltage sources maintain the values of their voltages in the event of a power-path fault so that the virtual ground moves to the site of the fault.

13. A method for powering a cable network in which the cable network need not be powered-down upon occurrence of a power-path fault and re-powered after repair, comprising the steps of:
   a) powering a trunk section with a first current;
   b) powering branch sections with a second current being approximately half the first current; and
   c) maintaining said first and second currents at their normal operating levels in the event of a power-path fault but adjusting a supply voltage, thereby creating a ground at the power-path fault site.

14. The method according to claim 13, further comprising the step of grounding a first branch including a first power-path fault prior to commencing a repair operation.

15. The method according to claim 14, further comprising the step of increasing the second current in a first co-branch of the first branch including the first power-path fault to be equal to the first current in the trunk.

16. The method according to claim 15, further comprising the step of removing the ground from the first branch after repair of the first power-path fault.

17. The method according to claim 16, further comprising the step of decreasing the second current in the first co-branch to be approximately half of the trunk current after repair of the first power-path fault.

18. The method according to claim 14, further comprising the step of grounding a second branch including a second power-path fault prior to commencing a repair operation.

19. The method according to claim 18, further comprising the step of increasing the second current in a second co-branch of the second branch including the second power-path fault to be equal to the first current in the trunk.

20. The method according to claim 19, further comprising the step of removing the ground from the second branch after repair of the second power-path fault.

21. The method according to claim 20, further comprising the step of decreasing the second current in the second co-branch to be approximately half of the trunk current after repair of the second power-path fault.

22. The method in accordance with claim 18 wherein said step of grounding a second branch is in response to an optical command channel.

23. The method in accordance with claim 14 wherein said step of grounding a first branch is in response to an optical command channel.

24. A method for powering a cable network having a trunk and a first plurality (n) of branches at at least a first end thereof such that the cable network need not be powered down upon occurrence of a power path fault and re-powered after repair, comprising the steps of:

a) powering a trunk section with a first current;

b) powering each of said plurality (n) of branches with a second current, such that a sum of all second currents equals the first current; and c) maintaining each of said second currents at a normal operating level in an event of a power path fault but adjusting a supply voltage, thereby creating a ground at a power path fault site.

25. The method according to claim 24, wherein the cable network has a second plurality (m) of branches at a second end of the cable network and further comprising the step of:

d) powering each of said second plurality (m) of branches with a third current, such that a sum of all third currents equals the first current.

26. The method according to claim 25, wherein a number (n) of branches in the first plurality (n) of branches is greater than a number (m) of branches in the second plurality (m) of branches.

27. The method according to claim 25, further comprising the step of:

e) maintaining each of said third currents at a normal operating level in an event of a power path fault in one of the second plurality of branches but adjusting a supply voltage, thereby creating a ground at a power path fault site in the one of the second plurality of branches.

28. The method according to claim 25, wherein the second current equals the third current.

29. The method according to claim 25, wherein the second current is greater than the third current.

30. The method according to claim 25, wherein a number (n) of branches in the first plurality (n) of branches equals a number (m) of branches in the second plurality (m) of branches.

31. The method according to claim 25, wherein said third current is approximately an equal fraction (1/m) of the first current.

32. The method according to claim 24, wherein a number (n) of branches in the first plurality of branches equals two.

33. The method according to claim 24, wherein said second current is approximately an equal fraction (1/n) of the first current.

* * * * *